C. H. WILSON.
RECORDING INSTRUMENT.
APPLICATION FILED JAN. 7, 1914.
1,133,597.
Patented Mar. 30, 1915.
3 SHEETS—SHEET 1.
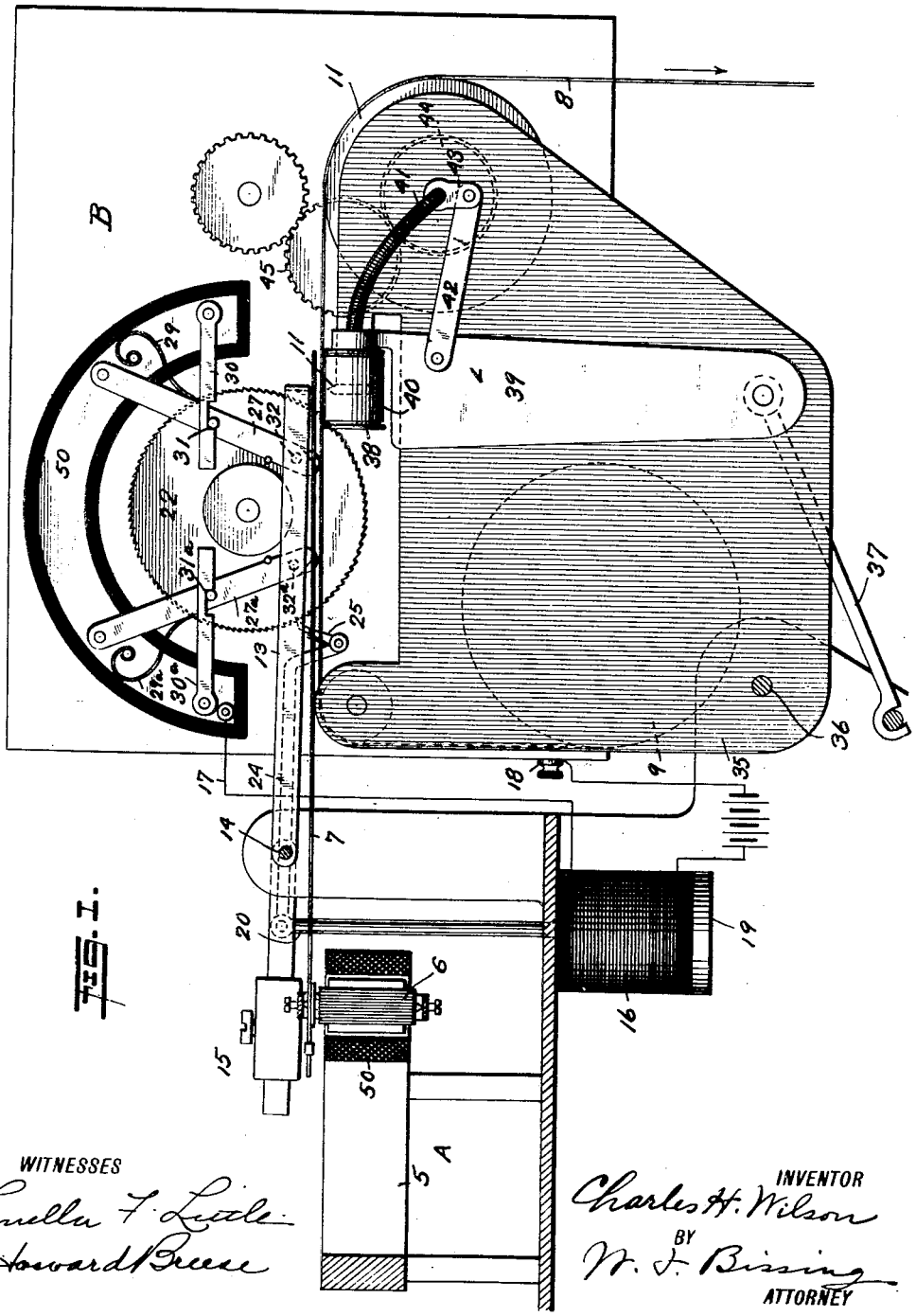
WITNESSES
INVENTOR
Charles H. Wilson
BY
W. F. Bissing
ATTORNEY

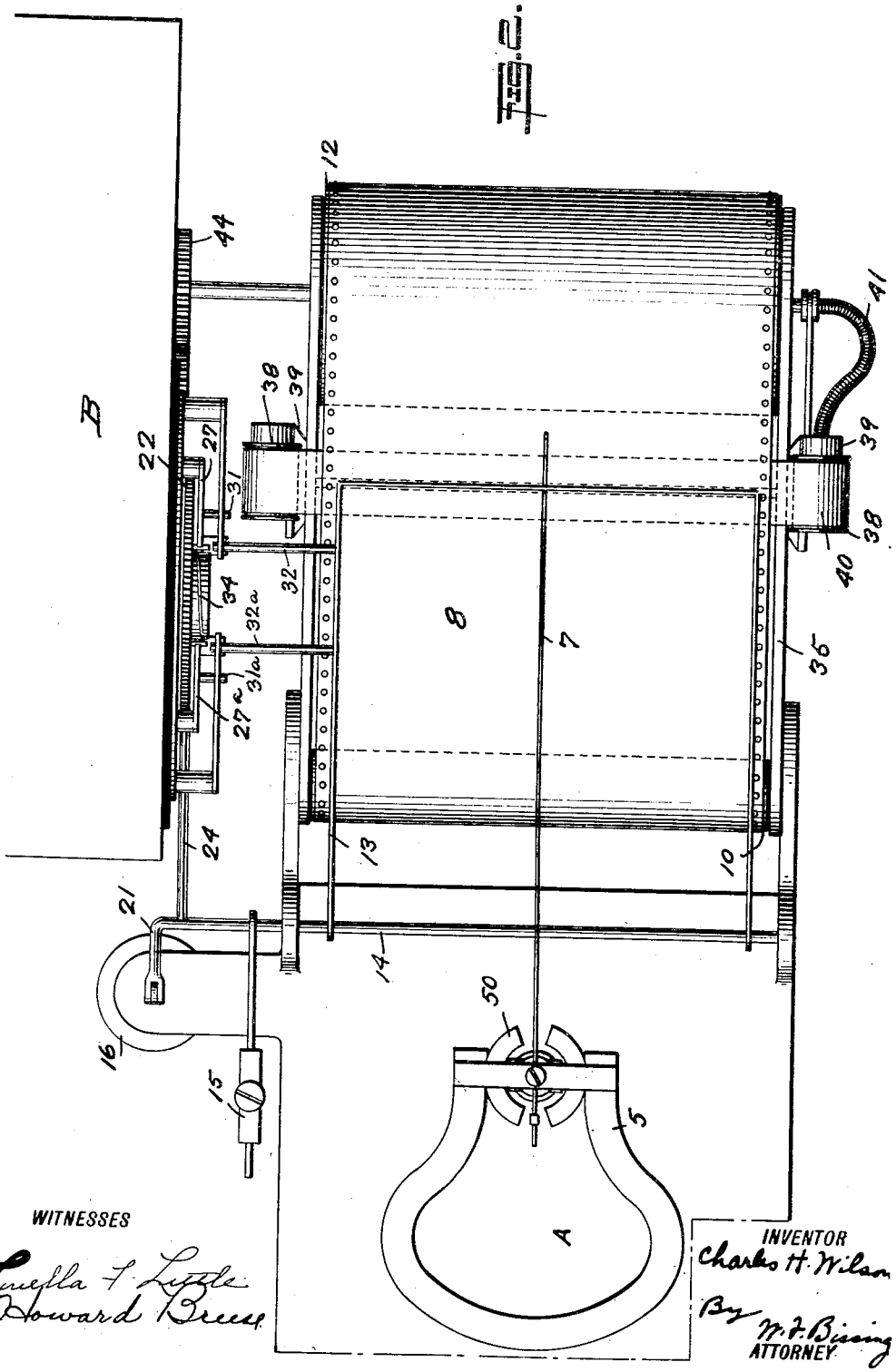

C. H. WILSON.
RECORDING INSTRUMENT.
APPLICATION FILED JAN. 7, 1914.
1,133,597.
Patented Mar. 30, 1915.
3 SHEETS—SHEET 3.
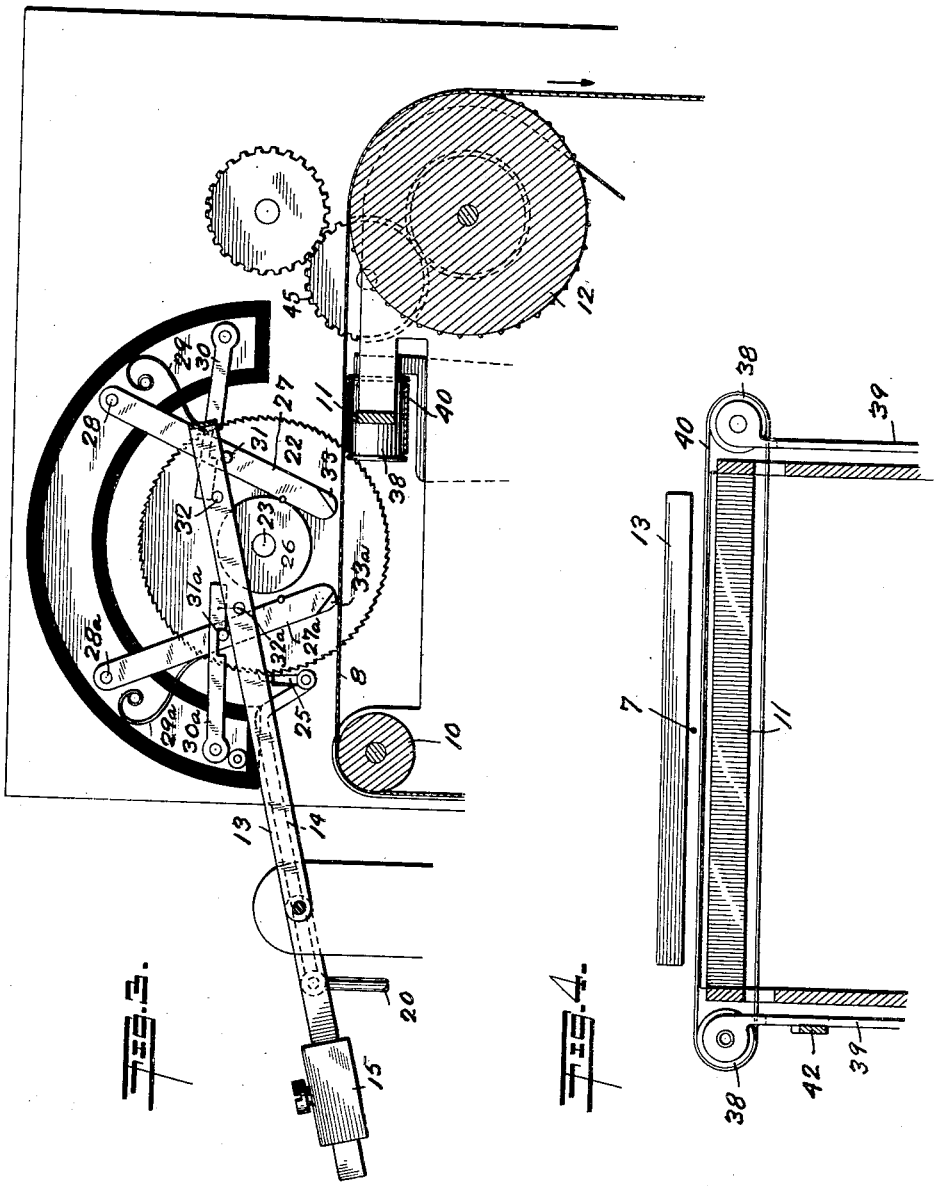
WITNESSES
INVENTOR
Charles H. Wilson
BY
ATTORNEY

UNITED STATES PATENT OFFICE.

CHARLES H. WILSON, OF MOUNT VERNON, NEW YORK, ASSIGNOR TO WILSON-MAEULEN COMPANY, INC., OF NEW YORK, N. Y., A CORPORATION OF NEW YORK.

RECORDING INSTRUMENT.

1,133,597.   Specification of Letters Patent.   Patented Mar. 30, 1915.

Application filed January 7, 1914. Serial No. 810,741.

*To all whom it may concern:*

Be it known that I, CHARLES H. WILSON, a citizen of the United States, residing at 65 Second avenue, city of Mount Vernon, State of New York, have invented certain new and useful Improvements in Recording Instruments, of which the following is a specification.

My invention is an improvement in recording instruments for recording on a suitable surface the deflections of a pointer arm, which arm deflects in accordance with the variations in the electric current or other force or motion under measurement.

In such devices the record is produced by operating a striker under the control of suitable clock mechanism, so that at predetermined intervals impressions of the pointer in its changing positions are made on a suitable clock-driven record surface.

The objects of this invention are to cause the record to be made in such a way as to guard against injury to the delicate instrument, the movements of which are to be recorded, to render the mechanism accurate and reliable in action, to avoid over-taxing the clock employed for timing the operation of the recording mechanism, to prevent injury to the delicate part of the apparatus when changing the record sheets, to avoid wearing the inking mechanism, and to avoid other difficulties heretofore experienced in such instruments and to secure various advantages, as will become apparent to those skilled in the art as the specification proceeds.

With these ends in view, the invention consists in the parts, improvements and combination hereinafter described and more particularly pointed out in the claims.

In the accompanying drawings illustrating the invention: Figure 1 is a side elevation of the instrument; Fig. 2 is a plan view thereof; Fig. 3 is a vertical sectional view of the upper part of Fig. 1, the parts being in a changed position, and Fig. 4 is a vertical transverse section showing certain of the parts.

The letter A designates an electrical measuring instrument having a magnet 5 with pole pieces 5ª and a movable coil 6 to which latter is attached the pointer or indicator 7. The coil 6 may be connected in series with the circuit which includes the thermal couple of the pyrometer.

The construction and operation of such instruments are well known and require no further description here. It will be understood that the instrument indicated may be replaced by any other instrument giving deflections. These deflections are to be recorded on a suitable surface, which in this instance is shown as a sheet of record paper 8, supplied from a roll 9 and passing over a roller 10 across a platen 11, to a drum 12, by which it is driven, the sheet being provided for this purpose with marginal perforations engaged by teeth on the drum.

Reciprocatory record impressing mechanism is employed to coöperate with the pointer, and comprises primarily a bail-like striker 13 or other suitable device, which is shown as pivoted at 14 to swing up and down above the pointer so that its crosspiece may strike the latter against the platen at suitable intervals. This striker is weighted to operate in one direction, and to this end is preferably provided with a counterweight 15 for swinging it upward away from the pointer. It will be obvious that a spring could be substituted for the counterweight.

Electrical means are provided for operating the striker, such means preferably including an electro-magnet 16 and an energizing circuit 17, 18, supplied from any suitable source. As shown, the armature 19 of the magnet is connected by a rod or link 20 to a crank arm 21 secured to the pivot shaft 14 of the striker, the arrangement being such that the pulling up of the armature forces the striker down upon the pointer, and in so doing stores up potential energy in the counterweight, which when the magnet is deënergized raises the striker again.

A clock mechanism is indicated generally at B. In accordance with the invention this mechanism is relieved of the duty of operating the record-impressing mechanism, the tendency being rather for this mechanism to assist the clock. The clock times the action of the electrical means for operating the striker, but preferably does not itself effect the opening and closing of the circuit 17, 18. These ends are accomplished by providing a one-way-acting connection between the recording-impressing mechanism and the clock mechanism, whereby the recording-impressing mechanism acts in assistance to and has its movement regulated by the clock mechanism on one stroke, and also by causing the recording-impressing means to open and close the said circuit. Generally speaking, the power is supplied by the batteries or other source of electric energy rather than by the clock; and the feature of the operating circuit being under the control of the striking mechanism is of great value in securing nice operation for these delicate instruments.

In the particular construction illustrated a ratchet wheel 22 is secured to a shaft 23 of the clock mechanism which rotates at a suitable speed for the purpose in view, and an arm 24 is direct-connected to the striker and carries a pawl 25 which engages the teeth of the ratchet. Consequently the striker is free to descend quickly under the action of the magnet, but in rising under the action of the counterweight is held back by the ratchet to move with the clock mechanism and in so doing assists the latter. Thus the energy supplied by the electrical means for operating the striker is in part applied to the clock.

The introduction of a time element into the upward movement of the striker not only determines the timing of the circuit making and breaking devices, as will now be described, but also causes the pointer 7 to be released slowly, thus avoiding violent up and down movements thereof, which would be injurious to the instrument.

The circuit making and breaking devices, controlled by the record-impressing mechanism, in order to insure a reliable action, are preferably of a special character, as will now be described.

A rotary contact wheel or disk 26 is driven by the clock mechanism, and may be mounted on the same shaft with the ratchet wheel 22. With it coöperate two contacts 27, 27$^a$, connected in parallel, pivoted at 28, 28$^a$ and urged by springs 29, 29$^a$ toward the rotary contact. Two pivoted catches 30, 30$^a$, provided with notches or shoulders to engage pins 31, 31$^a$ on the contacts 27, 27$^a$, are adapted to hold these contacts away from the rotary contact between them. The striker is provided with laterally-projecting pins 32, 32$^a$ adapted to lift the catches out of engagement with the pivoted contacts, when the striker approaches the end of its upward movement, so as to permit these contacts to spring against the rotary contact, which by wiping thereagainst insures the closing of the circuit. Two of the pivoted contacts, in parallel, are employed, so that if one does not complete the circuit the other will; and preferably the arrangement is such that the striker in rising releases first the contact 27, and then by further upward movement, in event of failure of this contact to close the circuit, releases the contact 27$^a$. If, however, the first contact closes the circuit, the other is not released, because the striker is immediately forced down by the magnet. When the striker reaches or approaches the limit of its downward movement its pins 32, 32$^a$ engage pallets 33, 33$^a$ on the contacts 27, 27$^a$, so as to reset these contacts out of engagement with the rotary contact, the gravity catches 30, 30$^a$ then falling into place. If only one of the contacts was released, of course only this one is reset.

It will be observed that the construction is such as to secure a blow contact on a moving surface, which, if necessary, produces a rubbing or rubbing contact.

In order to further insure reliability of action the rotary contact member 26 is provided (see Fig. 2) on its circumference with a contact piece 34 of platinum wire or other suitable material, which is disposed spirally, so that it has a lateral as well as longitudinal wiping action against the spring-pressed contact or contacts.

As will be apparent from the drawing, one wire 17 of the magnet circuit extends from the magnet to an insulated conducting plate 50, to which the spring-urged contacts are pivoted. The current passes by way of these contacts, when they are released, to the rotary contact, and thence by way of the frame of the machine to the other wire 18 and back to the magnet.

The paper receiving, guiding and driving members 9, 10 and 12, as also the platen 11, and a suitable ribbon or inking mechanism, are all mounted on a frame 35, which is located below the pointer 7 and is pivoted at 36 in its lower part, so as to swing downward away from the same when it is desired to replenish the record materials. Thus, the record paper can be replaced without having to operate close to the pointer, with consequent danger of injuring the delicate mechanism. Normally the frame is held up by a pivoted brace 37.

The striker 24, the pointer 7 and the electromagnet 16 for actuating the striker are mounted on one side and out of the way of the frame 35, so that the frame may drop away from the pointer when desired and without disturbing the striker operating mechanism.

The ribbon mechanism comprises two spools 38 of suitable character mounted on arms 39, which latter are preferably of spring material and tensioned outward, so as to hold the ink ribbon 40 taut. The ink ribbon is illustrated as in one color but a multicolor ribbon may be used. It may be an endless tape, or it may be of the kind which winds up on one spool while unwinding from the other. It is shown as being driven by a flexible shaft 41, driven from the shaft of the drum 12 and connected with one of the spools.

Means are provided for shifting the ribbon laterally in conjunction with its feed, so as to avoid wearing the ribbon in a line; and while this may be accomplished in a variety of ways I prefer to pivot the arms 39 at their lower ends to the frame 35 and to connect one or both of them by links 42 with cranks 43 on the shaft of the drum 12. The shaft of the said drum also carries a gear wheel 44, which when the frame is in normal position meshes with a gear 45, on the fixed part of the apparatus, driven by the clock mechanism, which thus serves to drive the record sheet and the ink ribbon and to effect the transverse shifting of the latter. While the record sheet is thus indicated as continuously moving, it will be understood that its movement may be intermittent in synchronism with the periodical movements of other parts, if desired.

In operation the striker descends upon the pointer at suitable intervals, striking the latter against the record sheet and the ink ribbon and these in turn against the platen. The latter preferably has a narrow edge, as shown, so that only a dot mark is made by any one blow. This mark is made on the underside of the paper, but the latter is preferably transparent, so that the record is visible, even before taking out of the machine. The striker having been brought down quickly by the magnet, and having reset the circuit closing devices, so that the magnet circuit is open, rises under the action of gravity on its counterweight. Its upward movement is rendered slow, however, because it is coupled to the ratchet wheel of the clock mechanism. The latter is not taxed by the movement of the striker in either direction, and is in a measure assisted thereby on the upstroke. At the conclusion of the predetermined interval the striker trips one of the circuit-closing devices, and if necessary the other, with the result that the circuit is again closed, the magnet energized and the striker again brought down. These operations are repeated.

The force of the electro-magnet is exerted on the striker throughout or substantially throughout its downward movement, whereby the blow delivered may be of definite power, strong enough to produce the impression with certainty but not heavier than necessary. Furthermore, because the electric circuit is under the control of the impression-producing mechanism, immediate upward movement of the striker after delivering the blow is insured, thus avoiding any strain on the pivots of the delicate galvanometer or other instrument due to frictional pull of the record paper on the pointer. This upward movement, however, while prompt in its inception, is gradual, for the dual purpose of avoiding violent upward rebound of the pointer and of timing the succeeding interval before the circuit is again closed by the striker.

What I claim as new is:

1. In a recording instrument, a record-impressing member weighted to move in one direction, electrical means for moving it in the opposite direction, and clock mechanism for timing the action of said electrical means, in combination with a connection between said record-impressing member and said clock mechanism whereby said member acts with and assists the clock mechanism in one direction.

2. In a recording instrument having a pointer or the like, the combination of a counterweight striker for coöperating with the pointer to produce a record, electro-magnetic means for actuating said striker, clock mechanism for controlling said electro-magnetic means, and a one-way-acting connection between said striker and clock mechanism whereby said clock mechanism permits the striker to move slowly away from the pointer, the striker in such movement acting with the clock mechanism.

3. In a recording instrument of the character described, the combination with a pointer or indicator, of a striker coöperative with said pointer, electro-magnetic means for operating the striker, clock mechanism, a pawl and ratchet connection between the striker and the clock mechanism so arranged that the clock mechanism allows the striker to move gradually away from the pointer, a circuit pertaining to said electro-magnetic means, and means for opening and closing said circuit dependent upon the positions of said striker.

4. In combination with an instrument having a pointer or indicator, electrically-operated record-impressing mechanism coöperating with said pointer, a circuit including an electro-magnet and a circuit controller, the latter controlled by said record-impressing mechanism, clock mechanism, and means whereby said record-impressing mechanism is connected to move with and in assistance to the clock mechanism in one direction.

5. In a recording instrument, the combination with a pointer or indicator, of a striker to coöperate therewith, electrical means for moving said striker quickly toward said pointer, clock mechanism, a one-way-acting connection whereby said clock mechanism allows the striker to move slowly with and in assistance to it in the opposite direction, and means dependent upon the position of the striker for controlling the circuit of said electrical means.

6. In a recording instrument, reciprocatory record-impressing mechanism, electrical means for operating the same, and means whereby said record-impressing mechanism opens and closes the circuit of said electrical means toward the end of its movement in opposite directions, respectively, in combination with clock mechanism, and means whereby said record-impressing mechanism acts in assistance to and is regulated by said clock mechanism when executing the return movement after each impression.

7. In a recording instrument, reciprocatory record-impressing mechanism, electrical means for operating the same, a spring-urged contact device controlling the circuit of said electrical means, a catch for detaining said contact device, and means whereby said record-impressing mechanism disengages said catch toward the end of its movement in one direction and resets said contact device toward the end of its movement in the opposite direction, in combination with clock mechanism, and means whereby said record-impressing mechanism acts in assistance to and is regulated by said clock mechanism when moving in one direction.

8. In a recording instrument, a pointer or indicator, reciprocating record-impressing mechanism coöperating therewith, electrical means for supplying the power to operate said mechanism, clock mechanism, and a connection whereby said reciprocating mechanism acts with and is regulated by said clock mechanism in its movement in one direction, in combination with means for opening and closing the circuit of said electrical means comprising a circular rotary contact driven by said clock mechanism, and a contact operated by said record-impressing mechanism to move into and out of engagement with said rotary contact.

9. In a recording instrument, a pointer or indicator, a striker coöperating therewith, a magnet for bringing said striker against said pointer, means, as a counterweight, for restoring the striker, clock mechanism, and a one-way-acting connection whereby said counterweighted striker acts with and is regulated by said clock mechanism in its movement away from the pointer, in combination with a circuit including said magnet, and means for making and breaking the circuit comprising a circular rotary contact driven by said clock mechanism, a spring-actuated contact, and means whereby the striker trips said spring-actuated contact at one time and resets it out of engagement with the rotary contact at another.

10. In a recording instrument, a pointer or indicator, counterweighted reciprocating record-impressing mechanism coöperating therewith, electrical means for supplying the power to operate said mechanism against the action of the weight, and clock mechanism which regulates the movement of said record-impressing mechanism in one direction, said clock mechanism being assisted by the weighted record impressing mechanism in combination with means for controlling said electrical means comprising two circuit making and breaking devices in parallel operated by said record-impressing mechanism.

11. In a recording instrument, a pointer or indicator, reciprocating record-impressing mechanism coöperating therewith, electrical means for supplying the power to operate said mechanism, and clock mechanism which regulates the movement of said record-impressing mechanism in one direction, in combination with means for controlling said electrical means comprising a circular rotary contact driven by said clock mechanism, a coöperative contact movable toward and from the rotary contact, and means for causing said coöperative contact to strike against the rotary contact at predetermined times and to remain in rubbing contact therewith for suitable periods.

12. In a recording instrument, a pointer or indicator, weighted reciprocating record-impressing mechanism coöperating therewith, electrical means for supplying the power to operate said mechanism, and clock mechanism which regulates the movement of said record-impressing mechanism in one direction, said clock mechanism being assisted by the weighted record impressing mechanism in combination with means for controlling said electrical means comprising a circular rotary contact driven by said clock mechanism, two spring-urged contacts in parallel, catches for holding the same out of engagement with said rotary contact, and means whereby said record-impressing mechanism toward the conclusion of its movement with the clock mechanism disengages first the catch of one of said spring-urged contacts and then in case of failure to complete the circuit disengages the other catch.

13. In a recording instrument, a pointer or indicator, reciprocating record-impressing mechanism coöperating therewith, electrical means for supplying the power to operate said mechanism, and clock mechanism for regulating the movement of said record-impressing mechanism in one direction, in combination with means for controlling said electrical means comprising a wheel driven by said clock mechanism and carrying a spiral contact piece on its circumference, and a complementary contact movable into and out of engagement therewith at predetermined intervals.

14. The combination with an instrument having a pointer or indicator, of a striker, an electro-magnet and circuit for bringing said striker against the pointer, the striker being weighted to return in the opposite direction, clock mechanism, circuit-controlling means timed thereby, a ratchet wheel driven by said clock mechanism, and a pawl connected to the striker and engaging the clock mechanism whereby the striker in its return movement acts with and is regulated by the clock mechanism.

15. In a recording instrument, the combination with a pointer, and means including a member for striking the pointer at predetermined intervals to produce a record, of a knife edged platen arranged transversely to said pointer and a frame carrying said platen and having means for receiving the record paper, said frame carrying an inking ribbon and being mounted so as to be movable away from said pointer when desired to replenish said paper said striking member and its operating means being arranged at one side and out of the way of said frame.

16. In a recording instrument, the combination with a pointer, and means including a member for striking the pointer at predetermined intervals to produce a record, of a frame pivoted at its lower part to swing downward away from the pointer and carrying a platen, inking means and means for receiving and moving a record surface, said striking member and its operating means being arranged at one side of and out of the way of said frame.

17. In a recording instrument, the combination with a pointer or indicator, means for striking the pointer at predetermined intervals to produce a record, and clock mechanism for timing the operation thereof, of a frame movable into and out of operative relation to the aforesaid elements, said frame carrying a platen, and ribbon and paper feed devices and having also elements of a driving train connected with said devices and meshing when the frame is in normal position with said clock mechanism.

18. In a recording instrument, the combination with a pointer or indicator, and means including a striker or the like for striking the pointer at predetermined intervals to produce a record, of a frame movable toward and away from said pointer, a knife edged platen thereon, paper and ribbon feed devices also carried by said frame, and means for automatically shifting the ribbon transversely in conjunction with its feed.

19. In a recording instrument, the combination with a pointer and means including a striker or the like for striking the pointer at predetermined intervals to produce a record; a knife-edged platen, feeding devices for the record strip, a ribbon carried by pivoted arms, a ribbon feed, and clock driven means for automatically moving said arms so as to shift the ribbon transversely to the direction of its feed.

20. In a recording instrument, the combination of a record-impressing member, a clock mechanism for timing the operation thereof, means other than the clock for moving said member in opposite directions, and a one-way acting connection between the record-impressing member and the clock mechanism whereby the member acts with and is timed by the clock mechanism in returning from each impression movement.

21. In a recording instrument, the combination with a pointer or indicator, of a striker coöperative therewith, means including an electric circuit for operating said striker, a clock mechanism operative to time the movements of the striker, and means dependent upon the operation of the striker for controlling said circuit.

22. In a recording instrument, the combination with a pointer or indicator, of record-impressing mechanism coöperative therewith, electro-magnetic means for operating said mechanism, clock mechanism for determining the intervals between the impression strokes of said impression-producing mechanism, means actuated by said impression-producing mechanism for changing the condition of said electro-magnetic means so as to cause an immediate commencement of the return movement of the said mechanism after each impression is effected, and a one-way acting connection between the impression-producing mechanism and the clock mechanism whereby the latter compels the former to execute its return movement gradually.

In testimony whereof, I have signed my name to this specification, in the presence of two subscribing witnesses.

CHAS. H. WILSON.

Witnesses:
S. S. Brown,
Ernestine H. Linn.